US012175392B2

(12) United States Patent
Morrow et al.

(10) Patent No.: US 12,175,392 B2
(45) Date of Patent: Dec. 24, 2024

(54) METHODS, SYSTEMS, AND VEHICLES FOR DETERMINING A WAIT TIME AT A POINT OF INTEREST

(71) Applicant: Toyota Motor North America, Inc., Plano, TX (US)

(72) Inventors: Jake Morrow, Carrolton, TX (US); Eduard VanderSmitte, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 584 days.

(21) Appl. No.: 16/811,777

(22) Filed: Mar. 6, 2020

(65) Prior Publication Data

US 2021/0279645 A1    Sep. 9, 2021

(51) Int. Cl.
| | |
|---|---|
| G06Q 10/02 | (2012.01) |
| G01C 21/36 | (2006.01) |
| G06N 5/04 | (2023.01) |
| G06Q 30/0202 | (2023.01) |
| G08G 1/14 | (2006.01) |
| H04W 4/021 | (2018.01) |
| H04W 4/029 | (2018.01) |

(52) U.S. Cl.
CPC ......... *G06Q 10/02* (2013.01); *G01C 21/3685* (2013.01); *G06N 5/04* (2013.01); *G06Q 30/0202* (2013.01); *G08G 1/146* (2013.01); *H04W 4/021* (2013.01); *H04W 4/029* (2018.02); *G06Q 2240/00* (2013.01)

(58) Field of Classification Search
CPC ............... G06Q 10/02; G06Q 30/0202; G06Q 2240/00; H04W 4/029; G01C 21/3685

USPC .............................................. 705/5
See application file for complete search history.

(56) References Cited

U.S. PATENT DOCUMENTS

| 9,449,121 | B2 | 9/2016 | Marti | |
| 11,526,916 | B2* | 12/2022 | Ziskind | ............... G06N 7/01 |
| 2009/0252318 | A1* | 10/2009 | Smith | ............ H04M 3/5238 |
| | | | | 379/265.1 |

(Continued)

FOREIGN PATENT DOCUMENTS

| JP | 05108674 A | 4/1993 |
| JP | 4426231 B2 | 3/2010 |

(Continued)

OTHER PUBLICATIONS

"How to See How Busy a Store is Right Now with google Maps," by Chris Hoffman, Apr. 19, 2020 (Year: 2020).*

(Continued)

*Primary Examiner* — Jeff Zimmerman
*Assistant Examiner* — Brian Adams Heflin
(74) *Attorney, Agent, or Firm* — Dinsmore & Shohl LLP

(57) ABSTRACT

A method of determining a wait time at a point of interest includes obtaining a current occupancy signal of a parking establishment associated with one or more points of interest, obtaining a historic occupancy signal of the parking establishment, determining, with one or more processors, a predicted wait time for the one or more points of interest associated with the parking establishment based on the current occupancy signal and the historic occupancy signal, and communicating the predicted wait time to a user with a user interface device.

16 Claims, 4 Drawing Sheets

(56) References Cited

U.S. PATENT DOCUMENTS

| | | | |
|---|---|---|---|
| 2015/0081348 A1* | 3/2015 | Avera | G06Q 10/02 |
| | | | 705/14.66 |
| 2016/0261984 A1* | 9/2016 | Shrinath | H04W 4/021 |
| 2017/0116528 A1* | 4/2017 | Barajas Gonzalez | |
| | | | G08G 1/0141 |
| 2018/0240161 A1* | 8/2018 | Cronin | G06Q 30/0281 |
| 2018/0247270 A1* | 8/2018 | Cronin | G06Q 10/109 |
| 2018/0336784 A1* | 11/2018 | Liu | G08G 1/096838 |
| 2019/0139258 A1 | 5/2019 | Slattery et al. | |
| 2019/0257665 A1* | 8/2019 | Friedman | G01C 21/3484 |
| 2019/0304216 A1* | 10/2019 | Mendelson | G07C 9/27 |
| 2020/0175870 A1* | 6/2020 | Oh | G06V 40/103 |
| 2020/0265474 A1* | 8/2020 | Brown | G06Q 30/0267 |
| 2021/0116582 A1* | 4/2021 | Krause | G01S 19/51 |
| 2021/0125445 A1* | 4/2021 | Zhang | G06N 20/00 |

FOREIGN PATENT DOCUMENTS

| | | | | |
|---|---|---|---|---|
| JP | 2018159996 A | * | 10/2018 | |
| WO | WO-2013099845 A1 | * | 7/2013 | ............. G06Q 10/02 |
| WO | 2017204794 A1 | | 11/2017 | |

OTHER PUBLICATIONS

Jones; Google is adding wait times for restaurants because it follows you everywhere (https://gizmodo.com/google-is-adding-wait-times-for-restaurants-because-it-1820216400); Published Jul. 11, 2017.

* cited by examiner

METHODS, SYSTEMS, AND VEHICLES FOR DETERMINING A WAIT TIME AT A POINT OF INTEREST

TECHNICAL FIELD

The present specification generally relates to methods, systems, and vehicle for determining a wait time and, more specifically, methods, systems, and vehicles for determining a wait time at one or more points of interest.

BACKGROUND

Patrons of restaurants may often make reservations ahead of time to ensure a table is available to them at a particular time. However, in many cases, reservations are not made ahead of time or the restaurant does not accept reservations. In such instances, the potential patron may need to decide whether or not a table is worth the wait. Restaurants may lose potential customers when wait times are too long. Other points of interest may be similarly affected, in that potential patrons may want to know how busy a particular point of interest is likely to be before making the trip there.

Accordingly, a need exists for alternative methods, systems, and vehicle for determining a wait time at a point of interest.

SUMMARY

In one embodiment, method of determining a wait time at a point of interest includes obtaining a current occupancy signal of a parking establishment associated with one or more points of interest, obtaining a historic occupancy signal of the parking establishment, determining, with one or more processors, a predicted wait time for the one or more points of interest associated with the parking establishment based on the current occupancy signal and the historic occupancy signal, and communicating the predicted wait time to a user with a user interface device.

In another embodiment, system for determining a wait time of a point of interest includes one or more processors, network interface hardware communicatively coupled to the one or more processors, and one or more memory modules communicatively coupled to the one or more processors. The one or more memory modules store logic that when execute by the one or more processors, cause the system to obtain a current occupancy signal of a parking establishment associated with one or more points of interest with the network interface hardware, obtain a historic occupancy signal of the parking establishment with the network interface hardware, determine, with the one or more processors, a predicted wait time for the one or more points of interest associated with the parking establishment based on the current occupancy signal and the historic occupancy signal, and communicate the predicted wait time to a user with a user interface device with the network interface hardware.

In yet another embodiment, a vehicle includes one or more processors, one or more user interface devices communicatively coupled to the one or more processors, one or more vehicle sensors communicatively coupled to the one or more processors and configured to output a vehicle sensor signal, network interface hardware communicatively coupled to the one or more processors, and one or more memory modules communicatively coupled to the one or more processors. The one or more memory modules store logic that, when executed by the one or more processors, cause the vehicle to communicate a point of interest request to a remote server, communicate the vehicle sensor signal to the remote server, receive a predicted wait time from the remote server with the network interface hardware, wherein the predicted wait time for a point of interest is based on the vehicle sensor signal, a current occupancy signal of a parking establishment associated with the point of interest, and a historic occupancy signal of the parking establishment associated with the point of interest, and communicate the predicted wait time to a user with the one or more user interface devices.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods, systems, and vehicles for predicting a wait time at a point of interest. Methods according to the present disclosure may include obtaining a current occupancy signal of a parking establishment associated with one or more points of interest, obtaining a historic occupancy signal of the parking establishment, determining, with one or more processors, a predicted wait time for the one or more points of interest associated with the parking establishment based on the current occupancy signal and the historic occupancy signal, and communicating the predicted wait time to a user with a user interface device. That is, current and historic parking information may be used to estimate a wait time at one or more points of interest associated with the parking establishment. In some embodiments, additional information from other sources (e.g., restaurant data, mobile device data, etc.) may additionally be used in estimate wait times. In this way, users may be able to estimate the expected wait time, or determine which point of interest will have the shortest wait time at a predetermined time (e.g., estimated arrival time). These and additional features will be described in greater detail herein.

Figure 1:
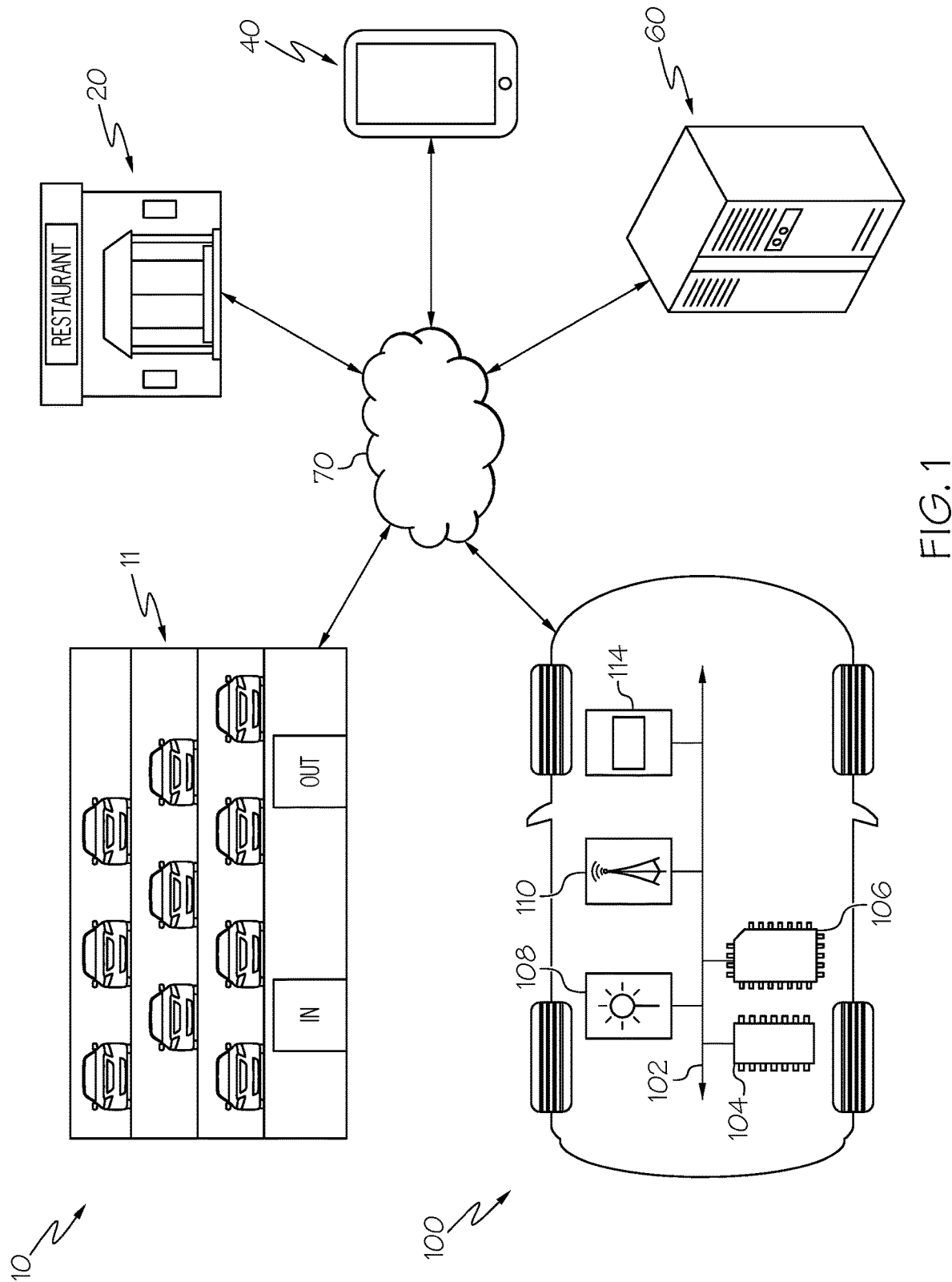
FIG. 1 schematically depicts a system for determining a wait time at one or more points of interest, including a schematically depicted vehicle, according to one or more embodiments shown and described herein.

Referring now to FIG. 1, a system 10 for determining a wait time at one or more points of interest 20 is schematically depicted. In some embodiments, the system 10 may provide a distributed computing environment, wherein data from one or more sources (e.g., one or more vehicles 100, the one or more points of interest 20, one or more parking establishments 11 associated with the one or more points of interest 20, one or more mobile devices 40, etc.) is obtained by one or more processors (e.g., located anywhere within the system 10 such as a remote server 60) that execute logic to cause the system 10 to determine a wait time at one or more points of interest 20. As used herein, one or more points of interest 20 may refer to any location where a queue of two or more people may form, and therefore have a wait time for delivery of expected services. Such locations may include restaurants, amusements parks, shops, etc. Accordingly, systems and methods as described herein may be used to determine estimated weight times at the one or more points of interest 20.

In various embodiments, and as noted above, sources of data for the system 10 may include one or more vehicles 100, one or more points of interest 20, one or more mobile devices 40, and/or one or more parking establishments 11 associated with the one or more points of interest 20. It is noted that each of source of data may be communicatively coupled to one another over a network 70, such that data may be communicated between the various sources and/or the remote server 60. As will be described in greater detail below, the remote server 60 may include any number of processors, memories, hardware, software, or the like to receive data from the various sources, and determine predicted wait times at the one or more points of interest 20.

As will be described in more detail, the one or more vehicles may supply data to the remote server 60 over network 70 to allow the remote server 60 to calculate a predicted wait time at one or more points of interest 20. In particular, data may be collected from many vehicles to determine patterns to determine a predicted wait time at the one or more points of interest 20. In particular, a vehicle 100 according to the present disclosure may include any airborne, terrestrial, or aquatic vehicle. Such vehicle 100 may include a communication path 102, one or more processors 104, one or more memory modules 106, one or more vehicle sensors 108, network interface hardware 110, and/or a user interface device 114.

The communication path 102 that provides data interconnectivity between various modules disposed within the vehicle 100. Specifically, each of the modules can operate as a node that may send and/or receive data. In some embodiments, the communication path 102 includes a conductive material that permits the transmission of electrical data signals to processors, memories, sensors, and actuators throughout the vehicle 100. In another embodiment, the communication path 102 can be a bus, such as for example a LIN bus, a CAN bus, a VAN bus, and the like. In further embodiments, the communication path 102 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The one or more processors 104 may include any device capable of executing machine-readable instructions stored on a non-transitory computer-readable medium. Accordingly, each processor may include a controller, an integrated circuit, a microchip, a computer, and/or any other computing device. It is noted that the one or more processors 104 may reside within the vehicle 100 and/or external to the vehicle 100, such that computing power may be distributed between the vehicle 100 and an external server (e.g., the remote server 60).

The one or more memory modules 106 are communicatively coupled to the one or more processors 104 over the communication path 102. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle 100 and/or external to the vehicle 100. The one or more memory modules 106 may be configured to store one or more pieces of logic, as described in more detail below: As noted above, the embodiments described herein may utilize a distributed computing arrangement to perform any portion of the logic described herein.

Embodiments of the present disclosure include logic stored on the one or more memory modules 106 that includes machine-readable instructions and/or an algorithm written in any programming language of any generation (e.g., 1GL, 2GL, 3GL, 4GL, and/or 5GL) such as, machine language that may be directly executed by the one or more processors 104, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic stored on the one or more memory modules 106 allows the one or more processors 104 to, for example, receive a point of interest request from the one or more user interface devices 114, communicate the point of interest request to the remote server 60, communicate, optionally, a vehicle sensor signal to the remote server 60, receive a predicted wait time from the remote server 60 with the network interface hardware 110, and communicate the predicted wait time to the user with the one or more user interface devices 114. In some embodiments, multiple point of interest requests may be communicated and/or specific criteria for the point of interest request, as will be described in greater detail below.

As noted above, communicatively coupled to the one or more processors 104 may be one or more vehicle sensors 108. The one or more vehicle sensors 108 may be any sensors configured to output a vehicle sensor signal, which may provide an occupancy signal for a parking establishment 11 associated with one or more points of interest 20. The current and historic occupancy signals may aid in calculating a wait time for a point of interest 20.

For example, vehicle sensor signals from multiple vehicles may be communicated to the remote server 60, which may allow the remote server 60 to determine a location of the one or more vehicles 100. For example, the one or more vehicle sensors 108 may include GPS units that output geographical coordinates of the one or more vehicles 100. Based on the coordinates of the one or more vehicles 100, the remote server 60 (or another processor) may determine the number of vehicles 100 parked at a point of interest 20, which may be indicative of or be correlated to a wait time at the point of interest 20. In some embodiments, GPS units of vehicles 100 may be used to set geofences around particular locations, e.g., around parking establishments 11 associated with one or more points of interest 20. When a vehicle 100 enters or leaves the geofenced area, the vehicle sensor signal may be communicated to the remote server 60 to allow the remote server 60 to know that a vehicle 100 is within or outside of the parking establishment 11 associated with the one or more points of interest 20. Accordingly, the remote server 60 may collect data regarding the number of vehicles 100 parked within a parking establishment 11 at any given time and determine how busy a point of interest 20 associated with the parking establishment 11 is likely to be, based on historical and current vehicle sensor signals. Accordingly, the one or more vehicle sensors 108 and/or additional sensors may be used to provide a current and/or historic occupancy signal of a parking establishment 11 associated with the one or more points of interest 20. In some embodiment, the historic occupancy data may instead be stored by the remote server 60 or another memory module within the system 10 where such data may be retrieved as needed.

As noted above, the vehicle 100 includes network interface hardware 110 communicatively coupled to the one or more processors 104 over the communication path 102. The network interface hardware 110 may communicatively couple the vehicle 100 with a network 70 (e.g., a cloud network 70). The network interface hardware 110 can be any device capable of transmitting and/or receiving data via the network 70. Accordingly, the network interface hardware 110 can include a communication transceiver for sending and/or receiving any wired or wireless communication. For example, the network interface hardware 110 may include an antenna, a modem, LAN port, Wi-Fi card, WiMax card, mobile communications hardware, near-field communication hardware, satellite communication hardware, and/or any wired or wireless hardware for communicating with or through other networks.

In embodiments, the network 70 (e.g., a cloud network) may include one or more computer networks (e.g., a personal area network, a local area network, grid computing network, wide area network, etc.), cellular networks, satellite networks and/or a global positioning system and combinations thereof. Accordingly, the vehicle 100 can be communicatively coupled to the network 70 via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

One or more user interface devices 114 may include any devices that allow a user to interact with the vehicle 100 and therefore the system 10. For example, the one or more user interface devices 114 may include any number of displays, touch screen displays, and input devices (e.g., buttons, toggles, knobs, keyboards, microphones, etc.) which allow interaction and exchange of information between the user and the system 10. Using the one or more user interface devices 114, a user may input one or more desired points of interest 20. Additionally, predicted wait times may be communicated to the user with the one or more user interface devices 114.

It is noted that in some embodiments, a mobile device 40 (e.g., smart phone, laptop, tablet, or the like) may be a user interface device 114. That is, the mobile device 40 may be used to request predicted wait time information regarding of desired point of interest 20 from the remote server 60, and the predicted wait time information may be displayed on the mobile device 40.

Figure 2:
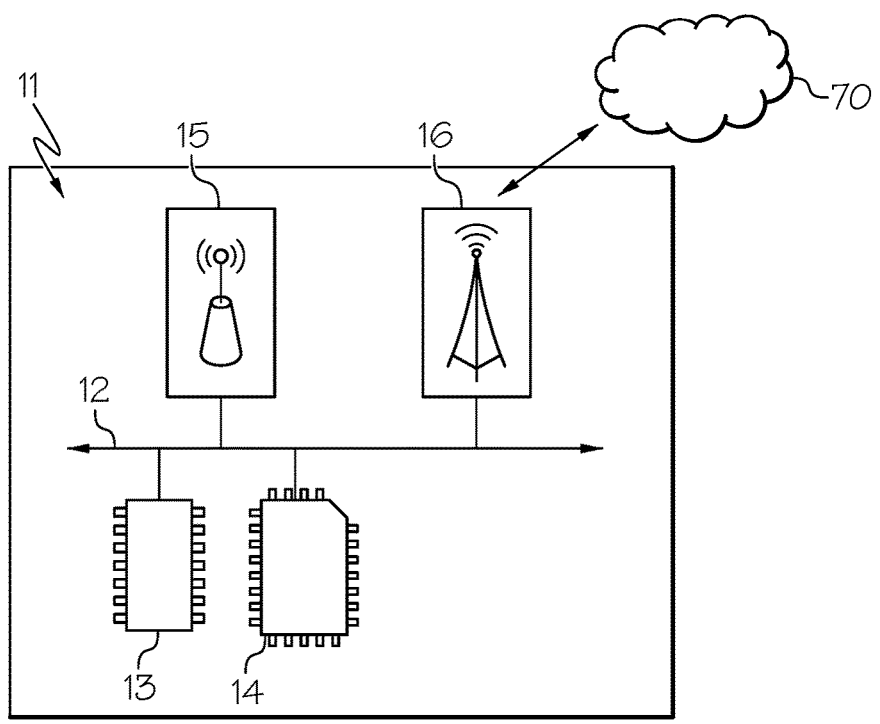
FIG. 2 schematically illustrates a smart parking garage, according to one or more embodiments shown and described herein.

As noted above, other potential sources of data may include the one or more parking establishments 11 associated with the desired point of interest 20. For example, and with reference to FIG. 2, in some embodiments the one or more parking establishments 11 associated with one or more points of interest 20 may include smart garages or the like that track and/or communicate with the one or more vehicles 100 to determine the occupancy within the parking establishment 11. For example, a smart garage may also include a communication path 12, one or more processors 13, one or more memory modules 14, network interface hardware 16, such as described above with respect to the one or more vehicles 100, and one or more available occupancy sensors 15. The one or more available occupancy sensors 15 may include any sensor configured to output a signal indicative of the available occupancy of the parking establishment 11. For example, the one or more available occupancy sensors 15 may include cameras, proximity sensors, gate movement counters or the like that indicate how much available spaces are likely within the parking establishment 11. In some embodiments, the one or more vehicles 100 may transmit location information to the parking establishment 11, which allows the one or more processors 13 to determine occupancy versus capacity. In some embodiments, the one or more processors 13 may determine which spaces are available within the garage. In some embodiments, the parking establishment 11 may communicate, e.g., through network interface hardware 16 with the vehicles 100 and/or mobile devices 40 of users entering and/or leaving the parking establishment 11 to determine an available occupancy within the parking establishment 11. In such embodiments, the parking establishment 11 may send current and/or historic occupancy signals to the remote server 60, and/or other processors within the system 10, to allow the remote server 60 to calculate predicted wait time based on the occupancy within the parking establishment 11. In some embodiments, historic occupancy data may instead be stored by the remote server 60 or another memory module within the system 10 where such data may be retrieved as needed.

Figure 3:
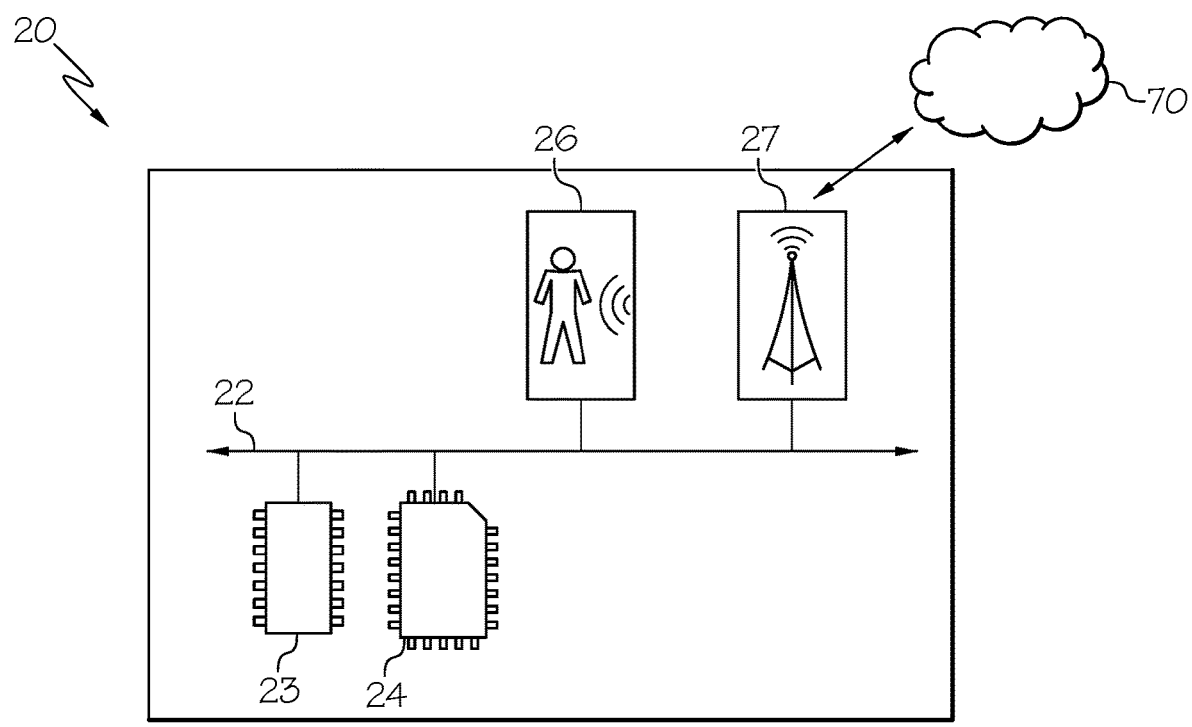
FIG. 3 schematically illustrates communicatively a point of interest, according to one or more embodiments shown and described herein.

Another potential source of data may be from the one or more points of interest 20 themselves. For example, and with reference to FIG. 3, the one or more points of interest 20 may include a communication path 22, one or more processors 23, one or more memory modules 24, network interface hardware 27, such as described above with respect to the one or more vehicles 100, and one or more patron occupancy sensors 26. For example, the one or more patron occupancy sensors 26 may include sensors, which count the number of people entering and/or leaving a point of interest 20, a point of sale (POS) system, reservation system, communications with one or more mobile devices 40 within point of interest 20, or the like. For example, the point of interest 20 may detect with the one or more patron occupancy sensors 26 how many people are within the point of interest 20. This may be compared to a capacity of the point of interest 20, which may indicate a current wait time within the point of interest 20. In some embodiments, the point of sale system may indicate how many transactions are occurring at any given time, which may indicate how busy the point of interest 20 is at a given time. In some embodiments, the one or more vehicles 100 may transmit location information and/or navigation information of the vehicle 100 to the one or more points of interest 30 to determine occupancy and capacity. Historic point of interest occupancy data may be retrieved from the one or memory modules 24 of the point of interest. In some embodiments, historic capacity data may instead be stored by the remote server 60 or another memory module within the system 10 where such data may be retrieved as needed.

Another potential source of data may include the one or more mobile devices 40. For example, the system 10 may track a location of the one or more mobile devices 40. That it, the one or more mobile devices 40 may send location information to the remote server 60, which may allow the remote server 60 to track a location of the one or more mobile devices 40. In some embodiments, the system 10 may set geofences around the one or more points of interest 20 and/or the one or more parking establishments 11 associated with the one or more points of interest 20. Accordingly, the one or more mobile devices 40 may output a signal to the system 10 when the one or more mobile devices 40 enter or leave a geofenced area. The system 10 may track a location of the one or more mobile devices 40. For example, by tracking the one or more mobile device 540 locations, the number of patrons entering and/or leaving a point of interest 20 and/or a parking establishment 11 associated with the point of interest 20 may be determined, which may be compared to the capacity of the one or more points of interest 20 and/or the parking establishment 11 (thereby providing a current and/or historic parking establishment occupancy signals and/or point of interest occupancy data), which may be used to determine a wait time for the one or more points of interest 20 and/or the parking establishment 11. In some embodiments, the system 10 may determine that a mobile device 40, which was in the one or more parking establishments 11 associated with a point of interest 20 has traveled into the point of interest 20, to confirm that the parking establishment 11 is associated with the point of interest 20.

As noted herein above, the information from the one or more sources may be supplied to a remote server 60 (for example a cloud server), which may comprise one or more processors and/or one or more memory modules which allow the remote server 60 execute logic stored on the one or more memory modules to obtain the information from the one or more sources and determine potential wait time for one or more points of interest 20. In some embodiments, the remote server 60 may further set geofencing areas (e.g., for points of interest 20 and/or parking establishments 11 associated with the points of interest 20), calculate vehicle routes, calculate times of arrival, make parking reservations, or the like. However, it should be noted, that in some embodiments, determinations may only be partially performed by the remote server 60 or performed by other processors provided within the system 10 (e.g., one or more processors 104 of a vehicle 100, a mobile device 40 (e.g., a smart phone, laptop, desktop, tablet, etc.), one or more processors 23 of the one or more points of interest 20, and/or one or more processors 13 the parking establishment 11 associated with the one or more points of interest 20.

Figure 4:
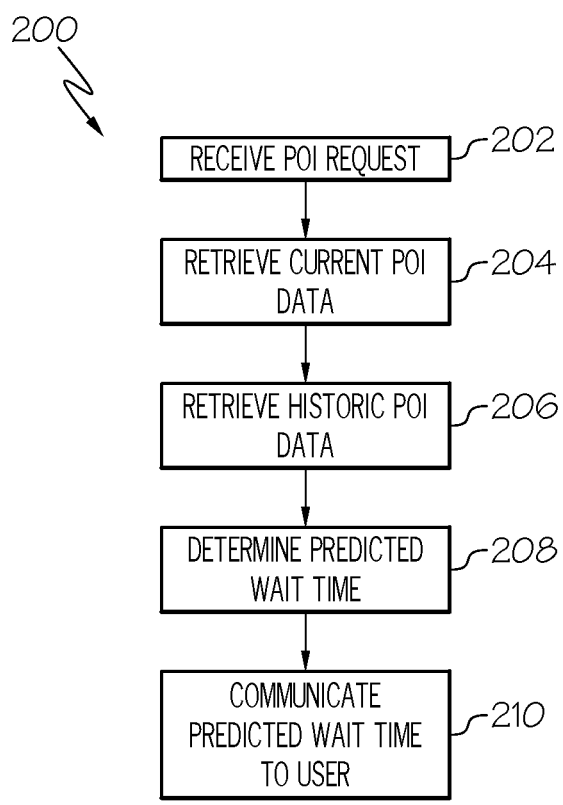
FIG. 4 depicts a method for determining a predicted wait time at one or more points of interest, according to one or more embodiments shown and described herein.

FIG. 4 depicts a flowchart illustrating a method 200 for determining a wait time at a point of interest 20. For example, at step 202 the method 200 includes receiving a point of interest request. The point of interest request may be received over the one or more user interface devices 114 and/or the mobile device 40, which may be communicated to the remote server 60, using the network interface hardware 110. The point of interest request may indicate one or more points of interest 20 in which a user may be interested. For example, a user may be deciding between a first restaurant and a second restaurant (or more) and input both restaurants to see the estimate wait times at both simultaneously, for example. In response to receiving the user input indicating the one or more point of interest 20, the vehicle 100 and or the remote server 60 may calculate (e.g., using location data, map data, current traffic data, etc.) a route to the point of interest 20 and an arrival time (e.g., estimated time of arrival).

In response to receiving the point of interest request, the remote server 60 may obtain current point of interest data at step 204. The current point of interest data may include a current occupancy signal of a parking establishment 11 associated with the one or more points of interest 20. Accordingly, the remote server 60 may execute logic to determine one or more parking establishments 11 associated with the one or more points of interest 20. The remote server 60 may determine a parking establishment 11 is associated with a point of interest 20 in a number of ways. For example, a geographic location within a predetermined range of the point of interest 20 may be indicative of the parking establishment 11 being associated with the point of interest 20. In other embodiments, the system 10 may track a location of one or more mobile devices 40 from a parking establishment 11 to a point of interest 20, and determine that the parking establishment 11 is associated with the point of interest 20. In some embodiments, geofenced areas may be established by the remote server 60 to indicate that a particular geographical area is associated with one or more points of interest 20).

The remote server 60 may obtain a current occupancy signal of one or more parking establishment 11 associated with a point of interest 20. As described above, the current occupancy signal of a parking establishment 11 may be based on one or more vehicle sensor signals received from one or more vehicle sensors 108, as described above. For example, vehicle sensor signals from multiple vehicles 100 may be communicated to the remote server 60, which may allow the remote server 60 to determine a location of the one or more vehicles 100. For example, the one or more vehicle sensors 108 may include GPS units that output geographical coordinates of the one or more vehicles. Based on the coordinates of the one or more vehicles 100, the remote server 60 (or another processor) may determine the number of vehicles parked at a point of interest 20 or within a parking establishment 11 associated with the point of interest 20, which may be indicative or be correlated to a wait time at the point of interest 20. For example, the current occupancy of the parking establishment may be correlated to the available capacity, which may be used to predict a wait time at a point of interest. As noted above, in some embodiments, GPS units of vehicles 100 may be used to set geofences around particular locations, e.g., around parking establishments 11 associated with one or more points of interest 20. When a vehicle 100 enters or leaves the geofenced area, the vehicle 100 sensor signal may be communicated to the remote server 60 to allow the remote server 60 to know that a vehicle 100 is within or outside of the parking establishment 11 associated with the one or more points of interest 20. Accordingly, the remote server 60 may collect data regarding the number of vehicles 100 currently parked within a parking establishment 11. In some embodiments, current occupancy data may include vehicle navigation information, such that vehicles on route to the point of interest 20 are also accounted for in wait time determination/prediction.

As noted above, in some embodiments the current occupancy signal may in addition to or instead of the one or more vehicle sensor signals, be obtained from the parking establishment 11 itself. For example, the parking establishment 11 associated with the one or more points of interest 20 may be smart garage. That is, the smart garage may output an available occupancy signal with the one or more available occupancy sensors 15 to indicate how full or how much parking is available at the one or more parking establishments 11 associated with the point of interest 20.

In some embodiments, the current occupancy signal may be obtained from one or more mobile devices 40. For example, the remote server 60 may track a location of the one or more mobile devices 40. For example, the remote server 60 may set geofences around the one or more parking establishments 11 associated with the one or more points of interest 20. The one or more mobile devices 40 may output a signal to the remote server 60 when the one or more mobile devices 40 enter or leave the geofenced area, which may allow the remote server 60 to determine a current occupancy of the one or more parking establishments 11 associated with the one or more points of interest 20. In some embodiments, the remote server 60 may continue to receive a location signal from the one or more mobile devices 40, which may allow the remote server 60 to determine whether the particular mobile device 40 entered the point of interest 20. Which may be used to determine current occupancy within the point of interest 20 itself.

Current point of interest data may further include current point of interest occupancy data for the particular point of interest 20. As noted above, a point of interest 20 may include one or more patron occupancy sensors 26. For example, the one or more patron occupancy sensors 26 may include sensors, which count the number of people entering and/or leaving a point of interest 20, the point of sale (POS) system, reservation system, communications with one or more mobile devices 40 within point of interest 20, or the like. For example, the point of interest 20 may detect with the one or more patron occupancy sensors 26 how many people are within the point of interest 20. This may be compared to a restaurant capacity, which may indicate a current wait time within the point of interest 20. In some embodiments, the point of sale system may indicate how many transactions are occurring at any given time, which may indicate how busy the point of interest 20 is at a given time.

The method 200 further includes obtaining historic point of interest data at step 206. The historic point of interest 20 data may be stored on one or more memory modules associated with the garage, the vehicle 100, the mobile device 40, the point of interest 20, and or the remote server 60. Such historic occupancy information may include, for example a historic occupancy signal of the parking establishment 11 and/or historic point of interest occupancy data from the point of interest 20. The historic data may be correlated to historic event data, such as holidays, weekends sporting events, etc. The historic data may also be correlated to days with particular weather (e.g., rain, snow, overcast, sunny, warm, cold, etc.) For example, some points of interest 20 may be busier when weather is good (e.g., amusements parks, patio restaurants, etc.) while some points of interest 20 may be busier during rainy or cold weather (e.g., museums, bookstores, indoor restaurants, etc.).

At step 208, the method 200 includes determining a predicted wait time based on at least the current point of interest 20 data and the historic point of interest 20 data. At step 210, the predicted wait time may be communicated to the user through the one or more user interface devices 114 (e.g., a display of the vehicle 100 and/or the mobile device 40 of the user).

As an example, wait times determinations may be estimated based estimated available parking versus capacity, restaurant capacity versus occupancy, number of people entering and/or leaving the point of interest and/or parking establishment, and/or estimates of how fast parties enter and/or leave a point of interest 20. For example, the amount of a time a vehicle 100 is at a parking establishment 11 associated with a point of interest 20 may indicate how busy the particular point of interest 20 is. For example, during non-peak hours, a vehicle 100 may be parked for an amount of time corresponding to non-peak hours (e.g., 1 hour). However, during peak hours a vehicle 100 may stay park for an extended period of time (e.g., 1.5 hours). That extended period of time over the average non-peak parking time (e.g., 0.5 hours) may correspond to an expected wait time.

As noted above, wait time determinations may further include obtaining current point of interest occupancy data from the point of interest and/or historic point of interest occupancy data from the point of interest 20. For example, when the point of interest 20 is at a certain capacity. For example, where capacity is low, e.g., the point of interest 20 is not busy, it may be assumed that a party is sat immediately and served. Accordingly, the time it takes between the parties' arrival and departure may indicate that time necessary to be serviced (e.g., eat, shop, etc.). However, when a restaurant is at capacity, the time may be increased beyond which what is the average time of service during a non-busy time. The average increased amount of time over a certain period may indicate the expected wait time. The average time may increase as the point of interest 20 becomes busier and decrease as the point of interest 20 becomes less busy.

Accordingly, determination of the predicted wait time may be further based on the current point of interest occupancy data and the historic point of interest occupancy data. That is combinations of data (e.g., occupancy data of the point of interest 20 and/or occupancy data of the parking establishment 11 associated with the point of interest 20, etc.) may be used to provide more precise estimated wait times. In some embodiments, there may be multiple points of interest 20 associated with a parking establishment 11. In such embodiments, using current and/or historic occupancy signals/data associated with each of the points of interest 20, the remote server 60 may further determine which businesses are most busy at a given time.

As noted above, the predicted wait time may be predicted for the estimated time of arrival of the user. Accordingly, historic data may be gathered regarding a similar time, and current data may be gathered, the data may be cross-referenced, and through machine learning, determine an expected wait time upon arrival of the user or at other predetermined times. It is noted that as the user gets closer to the point of interest 20, the estimated wait times may be updated corresponding to changes in available data.

In some embodiments, the remote server 60, and or the parking garage, may determine based on current and/or historic occupancy data of the parking establishment 11 a parking wait time for a parking spot within the parking establishment 11 associated with the one or more points of interest 20. Such parking availability information, or when a parking spot is expected to become available, may also be communicated (e.g., displayed) to the user with the user interface device 114.

In some embodiments, the user may input user input criteria into the user interface device 114. The user input criteria may indicate a time slot or multiple time slots (e.g., incremental time slots) when the user may want to go to the point of interest 20 (e.g., in 15 minutes, in 30 minutes, etc.). This may allow a user to better choose what time to leave so as to arrive when predicted wait times are shorter. Other user input criteria may include showing available parking, or when parking should become available, only showing points of interest 20 with wait times below a predetermined wait time, showing types of points of interest 20 (e.g., restaurants) within a certain area, or the like.

Figure 5:
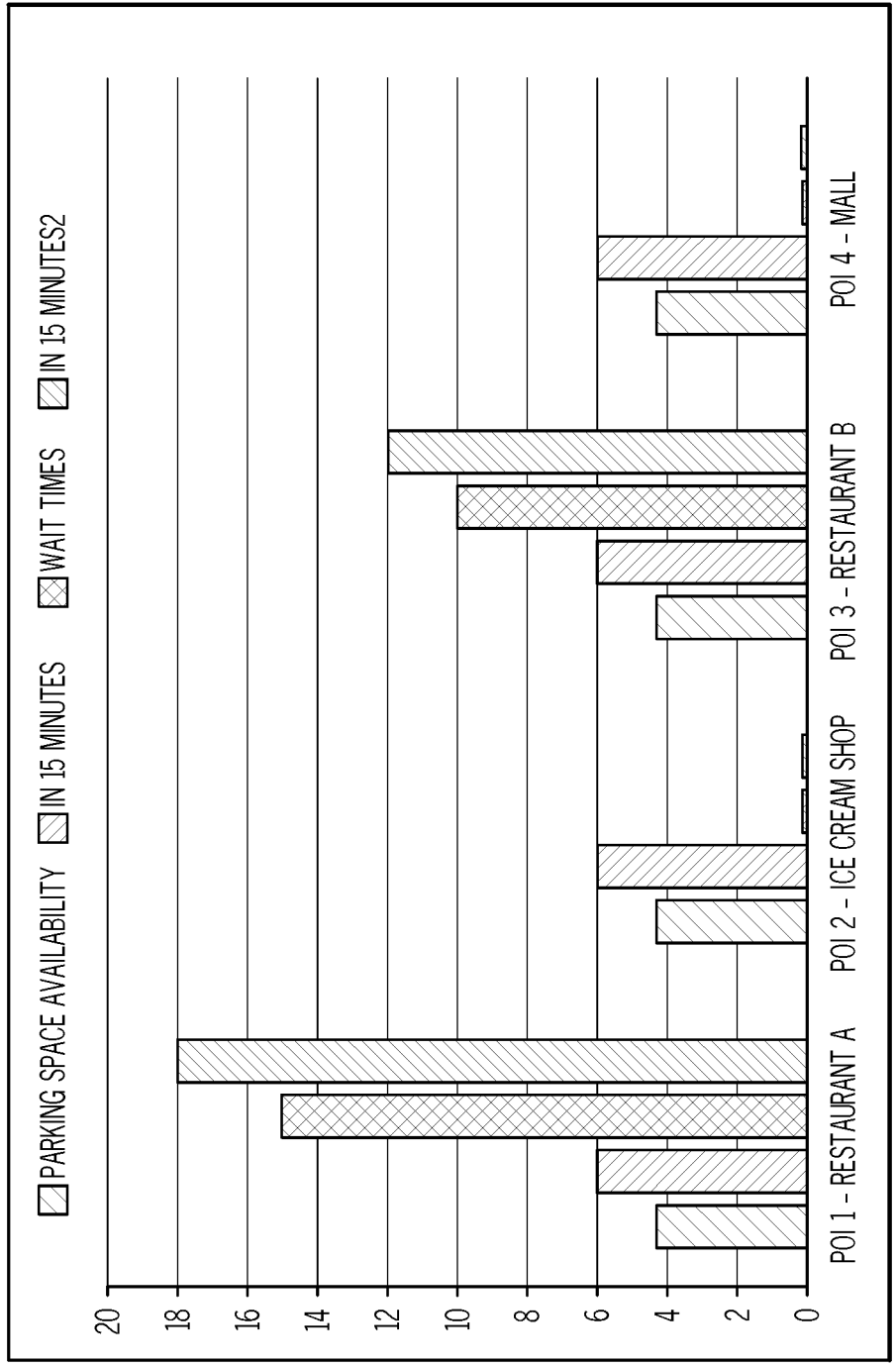
FIG. 5 depicts a display of a user interface device, according to one or more embodiments shown and described herein.

FIG. 5 depicts a user interface device 114 that is a display, as an example. The display shows a graphical user interface simultaneously indicating four points of interest (e.g., Restaurant A, an ice cream shop, Restaurant B, and mall). For each point of interest 20, there are four data points indicated as bars on a bar graph. It is noted that other graphical user interfaces are contemplated and possible without departing from the scope of the present disclosure. In the present disclosure parking space availability is the first column of each data set, parking space availability in 15 minutes is the second column in each data set, wait times at the point of interest, and wait times at the point of interest in 15 minutes. A user looking at the data may determine that Restaurant A is much busier that Restaurant B, and so there would be less of a wait time at Restaurant B. Other points of interest (e.g., the ice cream shop and the mall) are not currently busy (e.g., there is low or no wait time), so a user might decide to go to one of those points of interest.

If the user decides they wish to go to a point of interest 20, the user may input a confirmation with the user interface device 114 (e.g., press a "go" button). In some embodiments, in response to receiving the confirmation, the remote server 60, the one or more processors 104 of the vehicle 100, or the like, may reserve a parking spot within the parking establishment 11 in response to receiving the confirmation from the user interface device 114. In some embodiments, the remote server 60 may be configured to retrieve cost data regarding parking at the parking establishment 11 associated with the one or more points of interest 20 and communicate that to the user, who may, in some embodiments, pay for the parking through the user interface device 114.

It should now be understood that embodiments described herein are directed to methods, vehicles, and systems for predicting a wait time at a point of interest. Methods according to the present disclosure include obtaining a current occupancy signal of a parking establishment associated with one or more points of interest, obtaining a historic occupancy signal of the parking establishment, determining, with one or more processors, a predicted wait time for the one or more points of interest associated with the parking establishment based on the current occupancy signal and the historic occupancy signal, and communicating the predicted wait time to a user with a user interface device. That is current and historic parking information may be used to estimate a wait time at one or more points of interest associated with the parking establishment. In some embodiments, additional information from other sources (e.g., other vehicles, restaurant data, etc.) may additionally be used to estimate wait times. In this way, users may be able to estimate the expected wait time, or determine which point of interest will have the shortest wait time at a given time of arrival.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of determining a wait time at a point of interest, the method comprising:
   generating a geofence with a GPS unit around a parking establishment associated with one or more points of interest, and based on generating the geofence:
   obtaining, with one or more processors, a current occupancy signal of the parking establishment associated with one or more points of interest, based on one or more vehicle sensors communicating to a remote server when a vehicle is within or outside of the geofenced area;
   obtaining, with the one or more processors, a historic occupancy signal of the parking establishment;
   obtaining, with the one or more processors, vehicle navigation information of other vehicles on route to the point of interest;
   determining, with the one or more processors, a current predicted wait time and a future predicted wait time for the one or more points of interest associated with the parking establishment based on the current occupancy signal, the historic occupancy signal, and the vehicle navigation information of other vehicles;
   generating, with the one or more processors, a comparison illustrating the current predicted wait time and the future predicted wait time of the one or more points of interest;
   determining, with the one or more processors, a parking wait time for a parking spot within a parking establishment associated with the one or more points of interest;
   communicating, with network interface hardware communicatively coupled to the one or more processors, the parking wait time to the user with a user interface device; and
   displaying, as a graphic and with a display of the user interface device, the comparison of the current predicted wait time and the future predicted wait times of two or more points of interest and a comparison of the current parking wait time for a parking spot and a future parking wait time for a parking spot, wherein the graphic is updated based on the geofence being crossed.

2. The method of claim 1, further comprising:
   receiving a user input from the user interface device indicating the one or more points of interest;
   calculating an arrival time to the one or more points of interest; and
   determining the parking establishment associated with the one or more points of interest.

3. The method of claim 1, further comprising:
   receiving, with the one or more processors, a confirmation from the user interface device indicative of a selection of a point of interest; and automatically communicating with the parking establishment to reserve the parking spot within the parking establishment in response to receiving the confirmation from the user interface device.

4. The method of claim 1, further comprising:
obtaining a current point of interest occupancy data from the point of interest; and
obtaining historic point of interest occupancy data from the point of interest, wherein determination of the predicted wait time is further based on the current point of interest occupancy data and the historic point of interest occupancy data.

5. The method of claim 1, wherein historic occupancy data is associated with historic event data.

6. The method of claim 1, further comprising:
tracking one or more mobile device locations; and
determining current point of interest occupancy data based on the one or more mobile device locations, wherein determination of the predicted wait time is further based on the current point of interest occupancy data.

7. The method of claim 1, further comprising:
determining a user location,
monitoring a change in the user location, and
updating the user interface device to display the graphic of the current predicted wait time and the future predicted wait time in response to a change in location of the user.

8. A system for determining a wait time of a point of interest, the system comprising:
one or more processors;
network interface hardware communicatively coupled to the one or more processors;
one or more memory modules communicatively coupled to the one or more processors that store logic that when executed by the one or more processors, cause the system to:
generate a geofence with a GPS unit around a parking establishment associated with one or more points of interest, and based on generating the geofence:
obtain a current occupancy signal of the parking establishment associated with one or more points of interest with the network interface hardware, based on one or more vehicle sensors communicating to a remote server when a vehicle is within or outside of the geofenced area;
obtain a historic occupancy signal of the parking establishment with the network interface hardware;
obtaining vehicle navigation information of other vehicles on route to the point of interest;
determining, with one or more processors, a current predicted wait time and a future predicted wait time for the one or more points of interest associated with the parking establishment based on the current occupancy signal, the historic occupancy signal, and the vehicle navigation information of other vehicles;
generating a comparison illustrating the current predicted wait time and the future predicted wait time at the one or more points of interest;
determining, with the one or more processors, a parking wait time for a parking spot within the parking establishment associated with the one or more points of interest; and
communicate, with the network interface hardware, the parking wait time to the user with a user interface device; and
displaying, as a graphic, the current predicted wait time and the future predicted wait times and a comparison of the current parking wait time for a parking spot and a future parking wait time for a parking spot of two or more points of interest with the user interface device with the network interface hardware, wherein the graphic is displayed updated based on the geofence being crossed.

9. The system of claim 8, wherein the logic executed by the one or more processors further cause the system to:
receive a user input, with the network interface hardware, from the user interface device indicating the one or more points of interest;
calculate, with the one or more processors, an arrival time to the one or more points of interest; and
determine, with the one or more processors, the parking establishment associated with the one or more points of interest.

10. The system of claim 8, wherein the logic executed by the one or more processors further cause the system to:
receive, with the network interface hardware, a confirmation from the user interface device; and
reserve, with the one or more processors, the parking spot within the parking establishment in response to receiving the confirmation from the user interface device.

11. The system of claim 8, wherein the logic executed by the one or more processors cause the system to:
obtain, with the network interface hardware, a current point of interest occupancy data from the point of interest; and
obtain, with the network interface hardware, historic point of interest occupancy data from the point of interest, wherein determination of the predicted wait time is further based on the current point of interest occupancy data and the historic point of interest occupancy data.

12. A vehicle, comprising:
one or more processors,
one or more user interface devices communicatively coupled to the one or more processors, one or more vehicle sensors communicatively coupled to the one or more processors and configured to output a vehicle sensor signal,
network interface hardware communicatively coupled to the one or more processors, and
one or more memory modules communicatively coupled to the one or more processors that store logic that when executed by the one or more processors cause the vehicle to:
communicate a point of interest request to a remote server,
communicate the vehicle sensor signal to the remote server,
generate a geofence with a GPS unit around a parking establishment associated with one or more points of interest, and based on generating the geofence:
receive a current predicted wait time and a future predicted wait time from the remote server with the network interface hardware, wherein the current predicted wait time and the future predicted wait time for a point of interest is based on the vehicle sensor signal, a current occupancy signal of a parking establishment associated with the point of interest based on the vehicle sensor signal communicating when the vehicle is within or outside of a geofenced area, vehicle navigation information of other vehicles on route to the point of interest, and a historic occupancy signal of the parking establishment associated with the point of interest;

generate a comparison illustrating the current predicted wait time and the future predicted wait time at the one or more points of interest;

receive a parking wait time for a parking spot within the parking establishment associated with the point of interest;

communicate the parking wait time to the user with one or more user interface devices; and display, as a graphic, the comparison of the current predicted wait time and the future predicted wait times and a comparison of the current parking wait time for a parking spot and a future parking wait time for a parking spot of two or more points of interest with the one or more user interface devices, wherein the graphic is updated based on the geofence being crossed.

13. The vehicle of claim 12, wherein the logic executed by the one or more processors causes the vehicle to:

receive multiple point of interest requests with the one or more user interface devices; and simultaneously communicates predicted wait times to the user with the one or more user interface devices for each point of interest.

14. The vehicle of claim 12, wherein the logic executed by the one or more processors causes the vehicle to:

receive user input criteria with the one or more user interface devices, wherein the user input criteria includes time slots;

communicate the user input criteria to the remote server, wherein the remote server adjusts the predicted wait time; for each time slot selected by the user.

15. The vehicle of claim 14, wherein each time slot is displayed on a display of the one or more user interface devices.

16. The vehicle of claim 12, wherein the logic executed by the one or more processors further causes the vehicle to:

receive a confirmation from the user using the one or more user interface devices; and reserve the parking spot within the parking establishment in response to receiving the confirmation from the one or more user interface devices.

\* \* \* \* \*

UNITED STATES PATENT AND TRADEMARK OFFICE
CERTIFICATE OF CORRECTION

PATENT NO. : 12,175,392 B2  
APPLICATION NO. : 16/811777  
DATED : December 24, 2024  
INVENTOR(S) : Jake Morrow and Eduard VanderSmitte Page 1 of 2

It is certified that error appears in the above-identified patent and that said Letters Patent is hereby corrected as shown below:

In the Specification

In Column 1, Line(s) 8, delete "vehicle" and insert --vehicles--, therefor.

In Column 1, Line(s) 25, delete "vehicle" and insert --vehicles--, therefor.

In Column 2, Line(s) 31, after "herein", delete ":" and insert --;--, therefor.

In Column 2, Line(s) 34, after "herein", delete ":" and insert --;--, therefor.

In Column 3, Line(s) 23, after "each", delete "of".

In Column 6, Line(s) 30, delete "much" and insert --many--, therefor.

In Column 10, Line(s) 16, after "amount of", delete "a".

In Column 10, Line(s) 21, delete "park" and insert --parked--, therefor.

In Column 11, Line(s) 31, after "busier", delete "that" and insert --than--, therefor.

In the Claims

In Column 14, Line(s) 10, Claim 8, delete "displayed".

In Column 14, Line(s) 40, Claim 12, after "processors", delete "," and insert --;--, therefor.

In Column 14, Line(s) 42, Claim 12, after "processors", delete "," and insert --;--, therefor.

In Column 14, Line(s) 45, Claim 12, after "signals", delete "," and insert --;--, therefor.

Signed and Sealed this  
Twenty-fifth Day of February, 2025

Coke Morgan Stewart  
*Acting Director of the United States Patent and Trademark Office*

CERTIFICATE OF CORRECTION (continued)
U.S. Pat. No. 12,175,392 B2

In Column 14, Line(s) 47, Claim 12, after "processors", delete "," and insert --;--, therefor.

In Column 14, Line(s) 53, Claim 12, after "server", delete "," and insert --;--, therefor.

In Column 14, Line(s) 55, Claim 12, after "server", delete "," and insert --;--, therefor.

In Column 16, Line(s) 13, Claim 14, delete "time;" and insert --time,--, therefor.